United States Patent [19]
Miyajima et al.

[11] Patent Number: 5,278,271
[45] Date of Patent: Jan. 11, 1994

[54] PRESSURE SENSITIVE ADHESIVE COMPOSITION AND A PRESSURE SENSITIVE ADHESIVE SHEET, A LABEL AND A LAMINATE UTILIZING IT

[75] Inventors: Norihisa Miyajima; Issei Ozaki; Hajime Fukada, all of Urawa, Japan

[73] Assignees: Saiden Chemical Industry Co., Ltd.; Lintec Corporation, both of Tokyo, Japan

[21] Appl. No.: 800,533

[22] Filed: Nov. 27, 1991

[51] Int. Cl.$^5$ .................. C09J 133/24; C08F 226/02; C08F 218/02
[52] U.S. Cl. ..................... 526/307.3; 526/307.7; 428/412; 428/515
[58] Field of Search ...................... 526/307.3

[56] References Cited

U.S. PATENT DOCUMENTS 3,922,464 11/1975 Silver et al. .................. 428/355
4,012,364 3/1977 Farber .......................... 260/77.5 D

FOREIGN PATENT DOCUMENTS 2189489 1/1974 France .
2292382 12/1990 Japan .

OTHER PUBLICATIONS

World Patents Index Latest, Week 9103, Derwent Publications Ltd. AN 91-019251, London, GB of JP-A-2-292382 published Dec. 3, 1990.

Primary Examiner—Joseph L. Schofer
Assistant Examiner—Wu C. Cheng
Attorney, Agent, or Firm—Frishauf, Holtz, Goodman & Woodward

[57] ABSTRACT

The pressure sensitive adhesive composition is favorably utilized for lamination of plastic molded articles, particularly molded articles of polycarbonate resins and molded articles of acrylic resins because formation of blisters, such as bubbles and liftings, is prevented. It is favorably utilized for pressure sensitive adhesive sheets for surface protection because increase of adhesive strength is small, staining of the surface of the substrate is prevented and removability is excellent. It is also favorably utilized for electric insulation tapes because corrosion resistance, creep property and solvent resistance are excellent.

The pressure sensitive adhesive composition comprises as the main component thereof a specific acrylic copolymer prepared by copolymerization of a specific methyleneamine derivative of acrylamide, a specific amine derivative of acrylimide, a specific diacetone derivative of acrylamide and a specific ester of acrylic acid.

14 Claims, No Drawings

PRESSURE SENSITIVE ADHESIVE COMPOSITION AND A PRESSURE SENSITIVE ADHESIVE SHEET, A LABEL AND A LAMINATE UTILIZING IT

BACKGROUND OF THE INVENTION

1. Field of the Invention

The present invention relates to a novel pressure sensitive adhesive composition which has excellent blister resistance, excellent removability and no corrosive property against substrate and novel pressure sensitive adhesive sheet, label and laminate utilizing the adhesive composition and useful for attaching the sheet, the label and the laminate to molded articles. More particularly, the present invention relates to a novel pressure sensitive adhesive composition which has excellent cohesive strength and heat resistance and is favorably utilized for surface protecting sheets having resistance against formation of blisters, such as bubbles and lifting, on application to the surface of a substrate and good removability without leaving dirty remainings and for polyester tape electric insulators having no corrosive property against metals, such as copper wires, and also relates to novel pressure sensitive adhesive sheet, label and laminate having excellent resistance against formation of blisters by utilizing the adhesive composition.

2. Description of the Prior Art

As is well known, pressure sensitive adhesive sheets having a coating layer of a pressure sensitive adhesive are widely used. This is because the pressure sensitive adhesive sheets can be readily bonded to the surface of various substrates conveniently by merely putting on and lightly pressing to the substrate surface and, different from adhesives in general, the pressure sensitive adhesive forming the coating layer of the sheet contains no organic solvent so that no problem of environmental pollution are caused thereby.

As a consequence of the trend in recent years that light weight articles are preferred, the quantity of plastic products is rapidly increasing year by year. Thus, the occasion in which pressure sensitive adhesive sheets are attached to plastic goods or plastic packages of goods as a label is also increasing rapidly. Pressure sensitive adhesive sheets are quite often applied to the surface of polycarbonate resin plates for the purpose of protection of the surface from scratching and adjustment of sun light transmission.

Pressure sensitive adhesive sheets in general have a serious problem that, when a pressure sensitive adhesive sheet is applied and bonded to the surface of an article made of acrylic resin, polycarbonate resin and the like, so-called blisters are not rarely formed due to incomplete squeeze out of the gas between the substrate surface and the pressure sensitive adhesive sheet attached as a label or a protecting sheet. This problem has been unavoidable when the face stock film of the pressure sensitive adhesive sheet is made of a resin having gas barrier property such as conventional polyester resins. This problem is particularly serious at high temperatures or in conditions of high temperature and high humidity.

When blisters are caused in the pressure sensitive adhesive sheet attached to the surface of an article as a label, not only the article has a very unsightly appearance to decrease the commercial value but also the label and the like attached to the surface are liable to eventual falling. In a printed label made of a see-through pressure sensitive adhesive sheet, in particular, it is unavoidable that the appearance is extremely poor because the layer of the adhesive coating exhibits a pockmarked or white and cloudy appearance through the face-stock film.

Surface protecting sheets made from pressure sensitive adhesive materials coated on the surface of paper or synthetic resin films are widely utilized for metal plates, such as stainless steel plate, aluminum plate, steel plates and the like, glass products, molded resin products, such as ABS resin plates, acrylic resin plates and styrene resin plates, and the like other various products for the purpose of preventing corrosion and staining of the surface.

Pressure sensitive adhesive sheets prepared by coating a pressure sensitive adhesive material comprising as the main component thereof natural rubber or synthetic rubber compounded with resinous materials on the surface of a substrate, such as paper and synthetic resin film, have been widely used for the surface protecting sheets. In the pressure sensitive adhesive material used for these pressure sensitive adhesive sheets, though the low initial adhesive strength required for attaining good removability can be provided, adhesive strength is increased during storage time remarkably. The increase of the adhesive strength causes a problem that removal of the pressure sensitive adhesive sheet from the surface of the substrate becomes very difficult and, moreover, a part of the adhesive material very often remains on the surface of the substrate because of inferior stability of the pressure sensitive adhesive material against weathering.

Recently, acrylic pressure sensitive adhesive materials are widely used for the surface protecting sheets because of the good resistance against weathering. When the acrylic pressure sensitive adhesive material is utilized for the surface protecting sheets, the adhesive material is required to have high internal cohesive strength so that it has good removability and does not have adhesive transfer to the surface of the substrate. By this reason, acrylic polymers utilized in the adhesive material for the surface protecting sheets are modified by copolymerization with a monomer having carboxyl group as a functional group and the copolymer prepared are compound with a polyisocyanate compound, melamine resin, metal salts and the like as the external crosslinking agent and then crosslinked.

However, the acrylic pressure sensitive adhesive material has a problem that the adhesive material must be aged by standing for a long time at the room temperature or by heating because the adhesive material has low rate of crosslinking and the initial adhesive strength can not be kept at a low value immediately after the application to the substrate. The acrylic pressure sensitive adhesive material has another problem that adhesive strength is inevitably increased during storage time because the adhesive material contains copolymer comprising a monomer having a carboxyl group and removability from the substrate is poor.

In some cases, surface active agents, silicones, plasticizers or inorganic salts are added to the pressure sensitive adhesive material for the purpose of preventing the increase of the adhesive strength. However, this method has a problem that deficient printing and delamination sometimes occur because of contamination of the surface of substrate by bleeding of the added ingredients.

For the purpose of increasing rate of crosslinking and improving efficiency of processing, density of crosslinking in the pressure sensitive adhesive material is increased and cohesive strength is enhanced by using a copolymer comprising two or more kinds of monomer having functional groups, such as carboxyl group, methylol group, glycidyl group and the like, followed by crosslinking with an external crosslinking agent, such as polyisocyanate compounds, melamine resins, metal salts and the like. However, this type of pressure sensitive adhesive material is lacking in anchoring power to paper or synthetic film to cause problems such as transfer of the adhesive material to the substrate and removal or delamination during application to the substrate because of low adhesive strength caused by too high cohesive strength.

As exemplified above, conventional pressure sensitive adhesive sheets for surface protection do not satisfy the requirement that the non-staining property to the substrate and the balanced adhesive-removable properties are simultaneously attained.

Excellent adhesive strength, creep property and solvent resistance are required for polyester tapes for electric insulation as good industrial materials. Electric and electronic apparatus have been making progress in the direction of decreased size, light weight and higher performance in recent years and, along with this progress, tapes having excellent corrosion resistance, particularly resistance against electro-corrosion and resistance against coloring of copper, are being required more uregently. Acrylic pressure sensitive adhesive materials using comonomers having carboxyl group or hydroxyl group in a lowest possible amount have been mainly utilized for polyester tapes for electric insulation to achieve better balance between adhesive strength, creep properties and weatherability. However, pressure sensitive adhesive tapes having sufficiently excellent corrosion resistance have not been successfully prepared.

SUMMARY OF THE INVENTION

The present invention accordingly has an object to provide a pressure sensitive adhesive composition having excellent characteristics such (1) that the adhesive composition can provide an adhesive sheet which can prevent formation of blisters causing lifting and bubbling of the sheet when the sheet is applied to plastic molded plates, particularly to polycarbonate plates; (2) that the adhesive composition can provide a surface protecting sheet which has suitable initial adhesive strength, low rate of increase of the adhesive strength and excellent removability without leaving stain on the substrate; and (3) that the adhesive composition can provide a tape or a sheet for electric insulation having excellent creep properties, solvent resistance and corrosion resistance in addition to the favorable properties described above. Further objects of the invention is to provide sheets, labels and laminates having the above favorable properties by utilizing said pressure sensitive adhesive composition.

The present invention has been completed as a result of the extensive investigations undertaken with an object of providing a pressure sensitive adhesive composition having the favorable properties described above, leading to a discovery that the acrylic copolymers comprising monomer units having a carboxyl group utilized in conventional pressure sensitive adhesive compositions as the main composition thereof for the purpose of providing increased cohesive strength, heat resistance and adhesive strength have problems caused by the monomer units having a carboxyl group (1) that blisters are formed by insufficient adhesive strength in a condition of high temperature and high humidity and by lack of wetting of the adhesive composition on the surface of the substrate, (2) that removability becomes poor by increase of adhesive strength and (3) that corrosion readily occurs and that the object described above can be achieved by a composition comprising as the main component thereof an acrylic copolymer utilizing a comonomer unit having a specific functional group without utilizing a comonomer having a carboxyl group.

Thus, the present invention provides a pressure sensitive adhesive composition comprising as the main component thereof an acrylic copolymer prepared by copolymerization of from 0.1 to 20 weight % of the component (A) comprising at least one unsaturated monomer selected form the group consisting of the unsaturated monomers having the structure of the general formula:

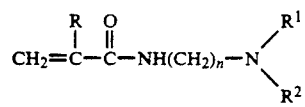

wherein R is a hydrogen atom or methyl group, $R^1$ and $R^2$ are a hydrogen atom or an alkyl group of 1 to 4 carbon atoms, respectively, n is an integer from 1 to 4 and $R^1$ and $R^2$ may the same or different;

from 0.01 to 10 weight % of the component (B) comprising at least one unsaturated monomer selected from the group consisting of the unsaturated monomers having the structure of the general formula:

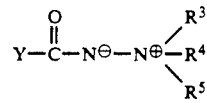

wherein Y is an organic group having a radical polymerizable unsaturated bond and $R^3$, $R^4$ and $R^5$ are an aryl, alkyl or substituted alkyl group, respectively, and may be the same or different with each other;

from 0 to 10 weight % of the component (C) comprising at least one unsaturated monomer selected form the group consisting of the unsaturated monomers having the structure of the general formula:

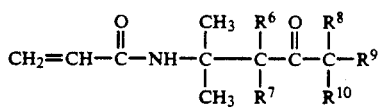

wherein $R^6$, $R^7$, $R^8$, $R^9$ and $R^{10}$ are a hydrogen atom or —CH$_2$OH group, respectively, and may be the same or different with each other; and from 60 to 99.89 weight % of the component (D) comprising at least one unsaturated monomer selected form the group consisting of the unsaturated monomers having the structure of the general formula:

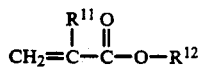

wherein $R^{11}$ is a hydrogen atom or methyl group and $R^{12}$ is an alkyl group of 1 to 14 carbon atoms.

The present invention also provides an adhesive sheet which is prepared by coating the pressure sensitive adhesive composition described above on a substrate.

The present invention also provides a label which is prepared by coating the pressure sensitive adhesive composition described above on a substrate.

The present invention also provides a laminate which is prepared by laminating sheets or plastic molded articles through an adhesive layer of the pressure sensitive adhesive composition described above.

Other and further objects, features and advantages of the invention will appear more fully from the following description.

DETAILED DESCRIPTION OF THE INVENTION

The invention is described in more detail in the following. The pressure sensitive adhesive composition of the invention is described first.

The component (A) which is a functional monomer utilized in the invention is an unsaturated monomer having the structure of the general formula [1]:

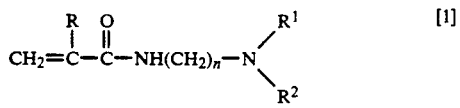

wherein R is a hydrogen atom or methyl group, $R^1$ and $R^2$ are a hydrogen atom or an alkyl group of 1 to 4 carbon atoms, preferably from 1 to 2 carbon atoms, respectively, n is an integer from 1 to 4, preferably from 2 to 3, and $R^1$ and $R^2$ may the same or different.

Examples of the component (A) are: N,N-dimethylaminoethylacrylamide, N,N-diethylaminoethylacrylamide, N-methylaminoethylacrylamide, aminoethylacrylamide, N-ethylaminoethylacrylamide, N,N-dibutylaminoethylacrylamide, N,N-dimethylaminopropylacrylamide, N,N-diethylaminopropylacrylamide and methacrylamides corresponding to the above acrylamide compounds in which a methyl group is substituted at the α-carbon of the acryamides. Preferable examples of the component (A) are N,N-dimethylaminoethylacrylamide, N,N-dimethylaminopropylacrylamide, N,N-diethylaminoethylacrylamide, N,N-diethylaminopropylacrylamide, N,N-dimethylaminoethylmethacrylamide, N,N-dimethylaminopropylmethacrylamide, N,N-diethylaminoethylmethacrylamide and N,N-diethylaminopropylmethacrylamide.

The unsaturated monomer of the component (A) may be utilized singly or as the combination of two or more kinds thereof in the component (A).

The component (A) exhibits catalytic effect when the acrylic copolymer is crosslinked by using crosslinking agents which will be described later. The component (A) also provides the acrylic copolymer of the invention with excellent elongation which conventional acrylic copolymers comprising monomer units having carboxyl group, monomer units having hydroxyl group or monomer units having epoxy group can not have and, at the same time, with the effect of prevention of decrease of adhesive strength in the condition of high temperature and high humidity. Thus, the component (A) is effective for providing a polymer having excellent resistance against blister formation.

The content of the component (A) is generally in the range from 0.1 to 20 weight %. When the content of the component (A) is less than 0.1 weight %, the favorable effect of the composition is not sufficiently exhibited and, when the content is more than 20 weight %, problems occur that the adhesive strength is decreased so much that the composition is not suitable for use as the blister resistant adhesive composition and that the composition tends to corrode metals because of excessive strength of alkaline property.

The preferable content of the component (A) is different according to the application to which the pressure sensitive adhesive of the invention is utilized. When it is utilized as the blister resistant pressure sensitive adhesive, the content of the component (A) is preferably in the range from 2.5 to 15 weight %, more preferably in the range from 2.5 to 10 weight %. When it is utilized as the P. S. A. of the surface protection, the content of the component (A) is preferably in the range from 1 to 10 weight %, more preferably in the range from 1 to 5 weight %. When it is utilized as the P. S. A. for electric insulation, the content of the component (A) is preferably in the range from 0.1 to 5 weight %, more preferably in the range from 0.5 to 3 weight %.

The component (B) comprises many kinds of reactive unsaturated monomers having the structure of general formula [2]:

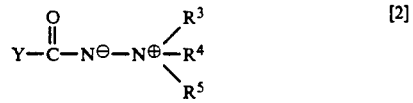

wherein Y is an organic group having a radical polymerizable unsaturated bond and $R^3$, $R^4$ and $R^5$ are an aryl, alkyl or substituted alkyl group, respectively, and may be the same or different with each other.

Preferable compounds as the unsaturated monomer of the component (B) are a reactive unsaturated monomer ($b_1$) having the structure of general formula [5] and a reactive unsaturated monomer ($b_2$) having the structure of general formula [6]. The reactive unsaturated monomer ($b_1$) having structure of general formula [5] is more preferable among these compounds.

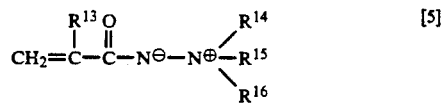

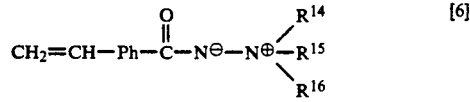

In the formula [5], $R^{13}$ is a hydrogen atom or methyl group. In both of the formula [5] and the formula [6], Ph is phenylene group and $R^{14}$, $R^{15}$ and $R^{16}$ are an aryl, alkyl, substituted alkyl or hydroxyl group, respectively. Preferably, the alkyl group and the substituted alkyl group have 1 to 6 carbon atoms. More preferably, at least one of $R^{14}$, $R^{15}$ and $R^{16}$ is hydroxyl group. The reactive unsaturated monomer (b₁) and the reactive unsaturated monomer (b₂) may be utilized as a salt, such as salt of hydrochloric acid, for copolymerization with a (meth)acrylic ester monomer to adjust reactivity in the copolymerization.

Examples of the reactive unsaturated monomer (b₁) are: 1,1-dimethyl-1-(2-hydroxypropyl)aminemethacrylimide, 1,1-dipropyl-1-(2-hydroxypropyl)aminemethacrylimide, 1,1-dimethyl-1-(2,3-dihydroxypropyl)aminemethacrylimide, 1,1-dipropyl-1-(2-hydroxybutyl)amineacrylimide, 1,1-dimethyl-1-(2-hydroxyoctyl)aminemethacrylimide, 1,1-dimethyl-1-(2-hydroxy-3-phenoxypropyl)aminemethacrylimide, 1,1-dimethyl-1-(2-hydroxy-3-methoxypropyl)aminemethacylimide, and 1,1-dimethyl-1-(2-hydroxy-2-phenylethyl)aminemethacrylimide. Preferable examples among these example are 1,1-dimethyl-1-(2-hydroxypropyl)aminemethacrylimide and 1,1-dimethyl-1-(2,3-dihydroxyproyl)aminemethacrylimide.

Examples of the reactive unsaturated monomer (b₂) are: 1,1-dimethyl-1-(2-hydroxypropyl)amine 4-isopropenylbenzimide and 1,1-dimethyl-1-(2-hydroxy-3-phenoxypropyl)amine 4-vinylbenzimide. The preferable example is 1,1-dimethyl-1-(2-hydroxypropyl)amine 4-isopropenylbenzimide.

The unsaturated monomer of the component (B) may be utilized singly or as the combination of two or more kinds thereof in the component (B).

The unsaturated monomer of the component (B) functions as a crosslinking component and provides the acrylic copolymer having large rate of crosslinking, small increase of adhesive strength and good removability. It functions more effectively in cooperation with the unsaturated monomer of the component (A).

When an isocyanate compound or an epoxy compound is used as an external crosslinking agent, the unsaturated monomer of the component (B) is advantageously utilized because the function of the component (B) is promoted by catalytic effect of the component (A).

The content of the component (B) is generally in the range from 0.01 to 10 weight %. When the content of the component (B) is less than 0.01 weight %, blisters are formed and removability is poor because of insufficient cohesive strength. When the content of the component (B) is more than 10 weight %, the adhesive strength is remarkably decreased because of too high cohesive strength.

The preferable content of the component (B) is different according to the application to which the pressure sensitive adhesive of the invention is utilized. When it is utilized as the blister resistant pressure sensitive adhesive, the content of the component (B) is preferably in the range from 0.05 to 5 weight %, more preferably in the range from 0.2 to 3 weight %. When it is utilized as the P. S. A. for surface protection, the content of the component (B) is preferably in the range from 0.5 to 8 weight %, more preferably in the range from 0.5 to 5 weight %. When it is utilized as the P. S. A. for electric insulation, the content of the component (B) is preferably in the range from 0.5 to 3 weight %, more preferably in the range from 1 to 2 weight %.

The unsaturated monomer of the component (C) is an unsaturated monomer having the structure of general formula [3]:

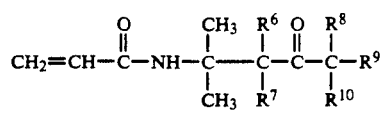

wherein $R^6$, $R^7$, $R^8$, $R^9$ and $R^{10}$ are a hydrogen atom or —$CH_2OH$ group, respectively, and may be the same or different with each other. Examples of the unsaturated monomer of the component (C) are diacetoneacrylamide, hydroxymethyldiacetoneacrylamide and the like. Preferable example is diacetoneacrylamide.

The unsaturated monomer of the component (C) may be utilized singly or as the combination of two or more kinds thereof in the component (C).

When the unsaturated monomer of the component (C) is comprised in the acrylic copolymer, the copolymer has a property to absorb gas generated in the composition. In the cases where plastic film or the like used as the substrate sheet of the adhesive sheet works as a barrier layer for a small amount of gas generated in the adhesive layer, the component (C) functions effectively to prevent formation of blisters which are to be formed as bubbles of the enclosed gas.

The content of the component (C) is generally in the range from 0 to 10 weight %, preferably in the range from 0.01 to 10 weight % and more preferably in the range from 1 to 5 weight %. When the content of the component (C) is more than 10 weight %, the adhesive strength is decreased because of too high cohesive strength.

The unsaturated monomer of the component (D) is an unsaturated monomer having the structure of general formula [4]:

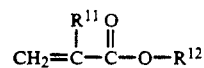

wherein $R^{11}$ is a hydrogen atom or methyl group and $R^{12}$ is an alkyl group of 1 to 14 carbon atoms, preferably 1 to 8 carbon atoms.

The component (D) is utilized in the acrylic copolymer to provide the adhesive composition with excellent weatherability, heat resistance and durability.

Examples of the unsaturated monomer of the component (D) are methyl acrylate, ethyl acrylate, butyl acrylate, decyl acrylate, 2-ethylhexyl acrylate, isooctyl acrylate and the like and corresponding esters of methacrylic acid. Preferable examples of the unsaturated monomer are methyl acrylate, ethyl acrylate, butyl acrylate and 2-ethylhexyl acrylate.

The unsaturated monomer of the component (D) may be utilized singly or as the combination of two or more kinds thereof in the component (D). When a combination of two or more kinds is utilized, the combination of methyl acrylate and 2-ethylhexyl acrylate and the combination of ethyl acrylate and butyl acrylate are preferable. When the combination of methyl acrylate and 2-ethylhexyl acrylate is utilized, the content of methyl acrylate is generally in the range from 20 to 50 weight % and the content of 2-ethylhexyl acrylate is generally in the range from 50 to 80 weight %. When the combination of ethyl acrylate and butyl acrylate is utilized, the content of ethyl acrylate is generally in the range from 5 to 50 weight % and the content of butyl acrylate is generally in the range from 50 to 95 weight %.

The content of the component (D) in the acrylic copolymer is generally in the range from 60 to 99.89 weight %, preferably in the range from 67 to 99.84 weight % and more preferably in the range from 80 to 98.3 weight %.

In the pressure sensitive adhesive composition of the invention, 50 weight % or less of the component (D) of the acrylic copolymer may be replaced by a copolymerizable unsaturated monomer other than the component (D) which is copolymerizable with the unsaturated monomers of each of the component (A), the component (B), the component (C) and the component (D).

The examples of the copolymerizable unsaturated monomer other than the component (D) are vinyl esters, such as vinyl formate, vinyl acetate and the like; acrylonitriles, such as acrylonitrile and the like; acrylates, such as dialkylaminoalkylene acrylate, glycidyl acrylate, hydroxyethyl acrylate, hydroxypropyl acrylate and the like; methacrylates, such as dialkylaminoalkylene methacrylate, glycidyl methacrylate, hydroxyethyl methacrylate, acetoacetoxyethyl methacrylate and the like; acrylamides, such as acrylamide, N-n-butoxymethylacrylamide, N-methylolacrylamide and the like; acrylic acid isocyanates, such as acrylic acid ethyl isocyanate and the like; vinylsilanes, such as alkoxyvinylsilane and the like; and acrylic acids, such as acrylic acid, methacrylic acid, itaconic acid, maleic anhydride and the like. Preferable examples among these compounds are vinyl acetate, glycidyl acrylate, glycidyl methacrylate, hydroxyethyl acrylate and hydroxyethyl methacrylate.

The kind of the copolymerizable unsaturated monomer other than the component (D) and the amount thereof utilized in the acrylic copolymer is selected according to the purpose of application of the pressure sensitive adhesive composition prepared by utilizing the acrylic copolymer. When more than 50% of the component (D) is replaced by the copolymerizable unsaturated monomer, the pressure sensitive adhesive composition prepared becomes too hard and is not suitable as the adhesive composition to achieve the object of the invention.

The acrylic copolymer can be prepared by copolymerizing the component (A), the component (B), the component (C), the component (D) and the optionally utilized copolymerizable unsaturated monomer by various conventional methods of copolymerization. Examples of the conventional methods of copolymerization are solution copolymerization in a solvent, such as toluene, hexane, ethyl acetate and the like; emulsion copolymerization in water; and bulk copolymerization substantially in the absence of any organic solvents to prepare a low molecular weight copolymer which is suitable for coating. For the purpose of improving weatherability, heat resistance and solvent resistance, crosslinking agents may be added to the composition in a suitable amount, if necessary, by diluting with a solvent.

The acrylic copolymer of the invention prepared by the method described above gives the pressure sensitive adhesive composition having excellent blister resistance, removability without staining and no corrosive property against metals. To prepare the adhesive composition having improve weatherability, heat resistance and solvent resistance, a crosslinking agent may be added to the composition in an amount of from 0.01 to 10 weight parts based on 100 weight parts of the base composition.

The kind of the crosslinking agent is not particularly limited. Preferable examples of the crosslinking agent are polyfunctional isocyanate compounds, polyfunctional epoxy compounds, metal chelate compounds and the like. The kind of the crosslinking agent and the amount thereof utilized in the adhesive composition is determined according to the kinds of the unsaturated monomers utilized in the acrylic copolymer and the purpose of application of the pressure sensitive adhesive composition prepared by utilizing the acrylic copolymer.

Agents generally utilized in conventional pressure sensitive adhesive materials, such as antioxidants, ultraviolet absorbing agents, tackifiers like rosin, phenolic resins, petroleum resins and the like, and like other agents, may be added to the adhesive composition according to necessity.

The pressure sensitive adhesive composition of the invention may be utilized as the pressure sensitive adhesive material by direct application or as a coated composit on a substrate, such as a plate, a film, a sheet, paper and the like, or on a label substrate.

Thickness of the layer of the pressure sensitive adhesive composition of the invention coated on a substrate, such as a sheet, or on a label substrate is not particularly limited. The thickness is generally in the range from 1 to 100 $\mu$m and preferably in the range from 5 to 30 $\mu$m.

It is preferable that the surface of the substrate, such as a sheet, is processed with a surface treatment, such as corona discharge treatment, plasma treatment and coating of primer, to provide better adhesiveness with the pressure sensitive adhesive composition.

Sheets or plastic molded articles may be formed into a laminated product by utilizing the pressure sensitive adhesive composition of the invention as the adhesive layer in the laminate.

Thickness of the adhesive layer in the laminate is not particularly limited but suitably selected according to the requirement of application. The thickness is generally in the range from 1 to 100 $\mu$m and preferably in the range from 5 to 30 $\mu$m.

Examples of the sheets utilized in the invention are plates, films, sheets and the like. Plastic sheets are preferably utilized and plastic sheets having transparency are more preferably utilized.

Material of the plastic sheets are not particularly limited but various kinds of plastics can be utilized. Examples of the plastics are polyolefin resins, such as polyethylene, polypropylene and the like; polyolefins containing chlorine, such as polyvinyl chloride and the like; aromatic vinyl resins, such as polystyrene and the like; acrylic resins, such as polymethyl methacrylate and the like; polycarbonate resins; polyester resins, such as polyethylene terephthalate and the like; polyallylate resins; polyether resins; and the like other plastics. Preferable example of the plastics is polyethylene terephthalate.

The plastic sheets may have a single layer structure or a multi-layer structure. The plastic sheets may be treated with vapor deposition of metals, such as aluminum, copper and the like, surface coating with dyestuffs or coloring.

Thickness of the sheet utilized in the invention is not particularly limited but suitably selected according to the requirement of application. The thickness is generally in the range from 5 to 250 $\mu$m and preferably in the range from 15 to 80 $\mu$m.

Examples of the plastic molded articles utilized in the invention are molded articles of various kinds of shape, such as films, sheets, plates, packaging containers, bottles, bags and the like others.

Materials of the plastic molded articles are not particularly limited but may be various kinds of plastics. Gas generating plastics which generate small amounts of gas during a long period of time are preferable materials for the pressure sensitive adhesive composition of the invention when the object of the invention is referred.

Many kinds of the gas generating resins are known. Examples of resins which generate rather remarkable amount of gas are resins comprising 5 mol % or more, particularly 15 mol % or more, of aromatic ring, such as polystyrene resins and polycarbonate resins, acrylic resins, such as polymethyl methacrylate and the like and polyolefin resins, such as polyethylene immediately after molding.

The polystyrene resins described above are resins which utilize 10 weight % or more, particularly 30 weight % or more, of styrene monomer in the process of preparation of the resin, such as polystyrene resins, high impact resistance polystyrene resins, acrylonitrile-butadiene-styrene resins, acrylonitrile-styrene resins, methyl methacrylate-butadiene-sytrene resins, acrylic rubber-acrylonitrile-styrene resins, acrylonitrile-(ethylene propylene rubber)-styrene resins, acrylonitrile-(chlorinated polyethylene)-styrene resins, noryl resins and the like resins. These resins are considered to generate gaseous styrene monomer after molding to cause the formation of blisters.

The resins comprising 5 mol % or more, particularly 15 mol % or more, of aromatic rings have tendency to absorb moisture or to adsorb low molecular weight substances even if they do not comprise monomeric units of styrene and blisters are formed by generation of gas from the absorbed moisture or adsorbed low molecular weight substances. The same kind of phenomenon takes place in case of the polymers having polar groups in the side group, such as acrylic resins.

Polyolefins, such as polyethylene, do not usually generate small amounts of gas continuously. However, these resins generate gas immediately after molding to cause the formation of blisters. Preparation of laminates with the adhesive layer formed by utilizing the pressure sensitive adhesive composition of the invention is effective for preventing such an undesirable phenomenon.

Examples of the plastic molded articles utilized favorably in the invention are polycarbonate resin plates for window panes, polymethyl methacrylate resin plates for window panes and molded articles of polystyrene, such as cassette tape cases made of polystyrene resins of good transparency. When pressure sensitive sheets are applied to the surface of polycarbonate resin plates for window panes or polymethyl methacrylate resin plates for window panes for the purpose of adjustment of sun light transmission or protection of the surface from scratching, blisters are particularly remarkable when they are formed. When pressure sensitive adhesive labels are applied to the surface of polystyrene molded articles of good transparency, blisters are also particularly remarkable when they are formed. Formation of blisters is actually a serious problem on polystyrene cases used as containers of magnetic tapes.

Lamination of sheets to such kinds of plastic molded articles through an adhesive layer utilizing the pressure sensitive adhesive composition of the invention is the remarkably effective method of preventing these problems.

The plastic molded articles described above comprise articles having the plastic layers at the surface of the article made of other materials as well as articles wholly made of the plastics.

The laminated products of the invention can be prepared by various methods. For example, the pressure sensitive adhesive composition is coated on the surface of sheets and the coated sheets are applied to the surface of plastic molded articles. As another example, the pressure sensitive adhesive composition is coated on the surface of molded plastic articles and sheets are applied to the surface of the molded plastic articles coated with the adhesive composition.

It is preferable that the surface of the plastic molded articles is processed with a surface treatment, such as corona discharge treatment, plasma treatment, coating of a primer and the like treatments, to provide better adhesive property with the adhesive composition before application of the adhesive composition.

The laminated products of the invention can be utilized in many kinds of application. Preferably examples of the application are window panes and cases for cassette tapes.

DESCRIPTION OF THE PREFERRED EMBODIMENTS

The invention will be understood more readily with reference to the following examples; however these examples are intended to illustrate the invention and are not to be construed to limit the scope of the invention.

EXAMPLE 1

| | |
|---|---|
| Butyl acrylate | 60 weight parts |
| Ethyl acrylate | 40 weight parts |
| N,N-dimethylaminopropylacrylamide | 3 weight parts |
| The unsaturated monomer having the following formula: | 1 weight parts |

$$CH_2=C-C-N-N-CH_2CH(OH)CH_3$$
$$\begin{array}{c} | \\ CH_3 \end{array} \quad \begin{array}{c} \| \\ O \end{array} \quad \begin{array}{c} \ominus \\ \end{array} \quad \begin{array}{c} \oplus \\ \end{array} \quad \begin{array}{c} CH_3 \\ \diagdown \\ CH_3 \end{array}$$

| | |
|---|---|
| 2,2'-azo-bis-isobutyronitrile | 0.5 weight parts |

The components shown above were dissolved into a mixture of 90 weight parts of ethyl acetate and 20 weight parts of n-hexane and the solution was stirred at 70° C. for 12 hours for polymerization. To the viscous solution thus prepared, 50 weight parts of toluene was added to dilute the solution and a solution of acrylic copolymer was prepared. Conversion of the polymerization was 98%, viscosity was 25,000 cps and content of the solid component was 38.5%.

EXAMPLE 2

To 100 weight parts of the solution of acrylic copolymer prepared in Example 1, 2 weight parts of Coronate L ® (a product of Nippon Polyurethane Co., Ltd., a polyfunctional isocyanate compound) was added and mixed. Thus, a pressure sensitive adhesive composition was prepared.

EXAMPLE 3

To 100 weight parts of the solution of acrylic copolymer prepared in Example 1, 0.25 weight parts of Adeka Resin EP-4100E® (a product of Asahi Denka Co., Ltd., a polyfunctional epoxy compound) was added and mixed. Thus, a pressure sensitive adhesive composition was prepared.

EXAMPLE 4

| | |
|---|---|
| 2-Ethylhexyl acrylate | 60 weight parts |
| Methyl acrylate | 30 weight parts |
| Vinyl acetate | 10 weight parts |
| N,N-dimethylaminopropyl-methacrylamide | 3 weight parts |
| The unsaturated monomer having the following formula: $$CH_2=C(CH_3)-C(=O)-N^{\ominus}(CH_3)-N^{\oplus}(CH_3)_2$$ | 1.2 weight parts |
| 2,2'-azo-bis-isobutyronitrile | 0.5 weight parts |

The components shown above were dissolved into a mixture of 90 weight parts of ethyl acetate and 20 weight parts of n-hexane and a solution of acrylic copolymer was prepared by the same method as in Example 1. Conversion of the polymerization was 97%, viscosity was 9,300 cps and content of the solid component was 38.2%. To 100 weight parts of the solution of acrylic copolymer prepared here, 0.25 weight parts of Adeka Resin EP-4100E® (a product of Asahi Denka Co., Ltd., a polyfunctional epoxy compound) was added and mixed. Thus, a pressure sensitive adhesive composition was prepared.

EXAMPLE 5

| | |
|---|---|
| Butyl acrylate | 60 weight parts |
| Ethyl acrylate | 40 weight parts |
| N,N-dimethylaminopropylacrylate | 3 weight parts |
| The unsaturated monomer having the following formula: $$CH_2=C(CH_3)-C(=O)-N^{\ominus}(CH_3)-N^{\oplus}(CH_3)-CH_2CH(OH)CH_3$$ | 1 weight parts |
| The unsaturated monomer having the following formula: $$CH_2=CH-C(=O)-NH-C(CH_3)(H)-C(H)(CH_3)-C(=O)-CH_3$$ | 3 weight parts |
| 2,2'-azo-bis-isobutyronitrile | 0.3 weight parts |

The components shown above were dissolved into a mixture of 90 weight parts of ethyl acetate and 20 weight parts of n-hexane and a solution of acrylic copolymer was prepared by the same method as in Example 1. Conversion of the polymerization was 98.2%, viscosity was 21,000 cps and content of the solid component was 39.3%. To 100 weight parts of the solution of acrylic copolymer prepared here, 0.25 weight parts of Adeka Resin EP-4100E® (a product of Asahi Denka Co., Ltd., a polyfunctional epoxy compound) was added and mixed. Thus, a pressure sensitive adhesive composition was prepared.

COMPARATIVE EXAMPLE 1

By using 60 weight parts of butyl acrylate, 40 weight parts of ethyl acrylate and 3 weight parts of acrylic acid, a solution of acrylic copolymer was prepared by the same method as in Example 1.

A pressure sensitive adhesive composition was prepared by adding and mixing 2 weight parts of Coronate L® to 100 weight parts of the solution of acrylic copolymer prepared here.

COMPARATIVE EXAMPLE 2

A pressure sensitive adhesive composition was prepared by the same method as in Comparative example 1 except that 0.25 weight parts of Adeka Resin EP-4100E® was used in place of Coronate L®.

COMPARATIVE EXAMPLE 3

A solution of acrylic copolymer was prepared by the same method as in Example 1 except that N,N-dimethylaminopropylacrylamide was not used. A pressure sensitive adhesive composition was prepared by adding and mixing 0.25 weight parts of Adeka Resin EP-4100E® to 100 weight parts of the solution of acrylic copolymer prepared here.

COMPARATIVE EXAMPLE 4

A solution of acrylic copolymer was prepared by the same method as in Example 1 except that the unsaturated monomer having the formula:

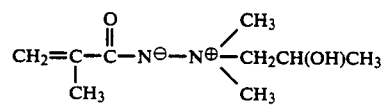

was not used. A pressure sensitive adhesive composition was prepared by adding and mixing 0.25 weight parts of Adeka Resin EP-4100E® to 100 weight parts of the solution of acrylic copolymer prepared here.

The solution of a pressure sensitive adhesive composition prepared in an Example or a Comparative example was coated on the surface of polyester film of 25 μm thickness so that the coating layer has 20±2 g/m² of the adhesive composition and the thickness of 18 μm. The coated film was dried by hot air stream at 100° C. for 1 minute and a pressure sensitive adhesive sheet was prepared.

The results of the evaluation of the pressure sensitive adhesive sheets thus prepared are shown in Table 1.

The solution of a pressure sensitive adhesive composition prepared in an Example or a Comparative example was diluted with toluene to prepare a solution having the solid content of 20%. The diluted solution was directly coated on the surface of a polyethylene film of 70 μm thickness pretreated with corona discharge so that the coating layer has thickness of 5 μm. The coated film was heated at 70° C. for 3 minutes and aged in an drying oven at 50° C. for 20 hours and a surface protecting sheet was prepared.

The results of the evaluation of the surface protecting sheet thus prepared are shown in Table 2.

The results in Table 1 and Table 2 clearly show the advantage of the pressure sensitive adhesive compositions and the pressure sensitive adhesive sheets of the invention.

The evaluation shown in Table 1 was conducted according to the following methods.

(1) Ball tack

Ball tack was measured according to J. Dow's method (Japanese Industrial Standard Z-0237), and shown by the stopped ball number.

(2) Adhesive strength

Adhesive strength when the sample was peeled at 180° angle was measured according to the method of Japanese Industrial Standard Z-0237 and shown by the value of force in gram per 25 mm width. The measurement was made 20 minutes after the sample was applied to the test substrate.

(3) Holding power

Holding power was measured at 40° C. under the loading of 1 kg according to Japanese Standard Z-0237 and shown by the time before dropping in second. The measurement was stopped at the time of 18,000 seconds. When the evaluation is shown as NC, no displacement of the sample was observed.

(4) Resistance against formation of blisters

A pressure sensitive adhesive sheet was applied to a transparent polycarbonate plate (a product of Nippon Test Panel Co., Ltd., having thickness of 2 mm) or a transparent acrylic plate (a product of Nippon Test Panel Co., Ltd., having thickness of 2 mm). After the plate with the pressure sensitive adhesive sheet was left standing for 1 hour in an air conditioned room adjusted to 23° C. and 65% relative humidity, it was heated for acceleration by standing for 1 hour in a heated air drying oven at 80° C. and the formation of blisters was evaluated by visual observation. The result of the evaluation is expressed by the following notations:

excellent: no formation of blisters was found.
good: small bubbles were found by a magnifying glass (10 times) in small numbers but no lifting was found.
fair: partial bubbles and liftings were found.
poor: bubbles and liftings were found all over.

(5) Corrosion resistance

A pressure sensitive adhesive sheet was applied to a copper plate (a product of Nippon Test Panel Co., Ltd.). After the plate with the pressure sensitive adhesive sheet was left standing in an air conditioned vessel adjusted to 50° C. and 90% relative humidity for 1 day, the adhesive sheet was removed from the copper plate and formation of rust was evaluated by visual observation. The result of the observation is expressed by the following notations:

good: no formation of rust was observed.
fair: slight formation of rust was observed.
poor: rust is formed and the surface turned black.

The evaluation shown in Table 2 was conducted according to the following methods.

(1) Initial adhesive strength

A pressure sensitive adhesive sheet for surface protection was applied to a stainless steel plate (SUS #304) which had been polished with Emery paper #280. Adhesive strength when the sample was peeled at 180° angle was measured 20 minutes after the sample was applied to the test substrate and shown by the value of force in gram per 25 mm width.

(2) Adhesive strength

A pressure sensitive adhesive sheet for surface protection having the size of 20×150 mm was applied to a stainless steel plate (SUS #304) which had been polished with Emery paper #280 and irradiated from the back side by using a weathermeter manufactured by Toyo Rika Kogyo Co., Ltd. for a specified period of time. Adhesive strength of the pressure sensitive adhesive sheet to the stainless steel plate was measured by the method of 180° peeling after the irradiation.

(3) Removability

The adhesive sheet for surface protection in a sample which was prepared and irradiated by using a weathermeter by the same method as in the evaluation of adhesive strength was removed vigorously from the stainless steel plate and the removability of the adhesive sheet from the stainless plate was evaluated by visual observation. The result of the observation is expressed by the following notations:

good: removed smoothly without remaining adhesive layer.
fair: adhesive strength is high and the adhesive layer is fractured by cohesive fracture; a small amount of adhesive layer remained on the surface of the stainless steel plate.
poor: adhesive strength is too high and the adhesive layer is fractured totally by cohesive fracture; a considerable amount of adhesive layer remained on the surface of the stainless steel plate.

(4) Staining

The adhesive sheet for surface protection in a sample which was prepared and irradiated by using a weathermeter by the same method as in the evaluation of adhesive strength was removed vigorously from the stainless steel plate and the staining of the surface of the stainless steel plate by the adhesive sheet was evaluated by visual observation. The result of the observation is expressed by the following notations:

good: no staining was found.
fair: a slight degree of cloudy staining was found.
poor: remaining of the adhesive layer was found on the surface of the stainless steel plate and staining of the surface of the stainless steel plate was observed.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, because the pressure sensitive adhesive composition of the invention comprises the specific acrylic copolymer as the main component thereof, the formation of blisters, such as bubbles and liftings, is prevented when the adhesive composition is utilized for lamination of plastic molded articles, particularly molded articles of polycarbonate resins and molded articles of acrylic resins. It is favorably utilized for pressure sensitive adhesive sheets for surface protection because increase of adhesive strength is small, staining of the surface of the substrate is prevented and removability is excellent. It is also favorably utilized for electric insulation tapes because corrosion resistance, creep property and solvent resistance are excellent.

TABLE 1

| | Characteristics of the pressure sensitive adhesive sheet | | | | | | |
|---|---|---|---|---|---|---|---|
| | | adhesive strength (g/25 cm) | | | resistance against formation of blisters | | |
| Example | ball tack | polycarbonate plate | acrylic resin plate | holding power (sec) | polycarbonate plate | acrylic resin plate | corrosion resistance |
| Example 1 | 11 | 1200 | 1500 | 3000 | good | excellent | good |
| Example 2 | 9 | 920 | 990 | NC/18000 | excellent | excellent | good |
| Example 3 | 11 | 650 | 710 | NC/18000 | excellent | excellent | good |
| Example 4 | 10 | 520 | 550 | NC/18000 | excellent | excellent | good |
| Example 5 | 10 | 390 | 430 | NC/18000 | excellent | excellent | good |
| Comparative example 1 | 6 | 950 | 1200 | 10200 | poor | poor | poor |
| Comparative example 2 | 7 | 1180 | 1200 | 2000 | poor | poor | poor |
| Comparative example 3 | 11 | 440 | 500 | 15000 | fair | good | good |
| Comparative example 4 | 11 | 590 | 580 | 11000 | fair | good | fair |

TABLE 2

| | | irradiation time of weathermeter (hour) | | | | |
|---|---|---|---|---|---|---|
| | | 0 | 80 | 160 | 180 | 200 |
| Example 2 | initial adhesive strength | 290 | — | — | — | — |
| | adhesive strength | — | 420 | 530 | 720 | 850 |
| | removability | — | good | good | good | good |
| | staining | — | good | good | good | fair |
| Example 3 | initial adhesive strength | 210 | — | — | — | — |
| | adhesive strength | — | 350 | 390 | 400 | 450 |
| | removability | — | good | good | good | good |
| | staining | — | good | good | good | good |
| Example 4 | initial adhesive strength | 180 | — | — | — | — |
| | adhesive strength | — | 250 | 290 | 490 | 550 |
| | removability | — | good | good | good | good |
| | staining | — | good | good | fair | fair |
| Example 5 | initial adhesive strength | 150 | — | — | — | — |
| | adhesive strength | — | 220 | 200 | 350 | 390 |
| | removability | — | good | good | fair | fair |
| | staining | — | good | good | fair | fair |
| Comparative example 1 | initial adhesive strength | 410 | — | — | — | — |
| | adhesive strength | — | 550 | 820 | 1100 | 1300 |
| | removability | — | fair | fair | poor | poor |
| | staining | — | fair | poor | poor | poor |
| Comparative example 2 | initial adhesive strength | 390 | — | — | — | — |
| | adhesive strength | — | 510 | 620 | 920 | 1300 |
| | removability | — | fair | fair | poor | poor |
| | staining | — | good | fair | poor | poor |
| Comparative example 3 | initial adhesive strength | 340 | — | — | — | — |
| | adhesive strength | — | 410 | 490 | 720 | 800 |
| | removability | — | fair | fair | fair | poor |
| | staining | — | good | fair | fair | poor |
| Comparative example 4 | initial adhesive strength | 380 | — | — | — | — |
| | adhesive strength | — | 450 | 510 | 690 | 780 |
| | removability | — | good | good | fair | poor |
| | staining | — | fair | fair | poor | poor |

What is claimed is:

1. A pressure sensitive adhesive composition comprising as the main component thereof an acrylic copolymer prepared by copolymerization of from 0.1 to 20 weight % of the component (A) comprising at least one unsaturated monomer selected from the group consisting of unsaturated monomers having the structure of the general formula:

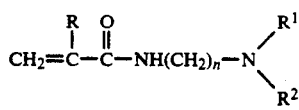

wherein R is a hydrogen atom or methyl group, $R^1$ and $R^2$ are a hydrogen atom or an alkyl group of 1 to 4 carbon atoms, respectively, n is an integer from 1 to 4 and $R^1$ and $R^2$ may be the same or different;

from 0.01 to 10 weight % of the component (B) comprising at least one unsaturated monomer selected from the group consisting of unsaturated monomers having the structure of the general formula:

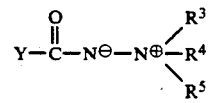

wherein Y is an organic group having a radical polymerizable unsaturated bond and $R^3$, $R^4$ and $R^5$ are an aryl, alkyl or substituted alkyl group, respectively, and may be the same or different with each other;

from 0 to 10 weight % of the component (C) comprising at least one unsaturated monomer selected from the group consisting of unsaturated monomers having the structure of the general formula:

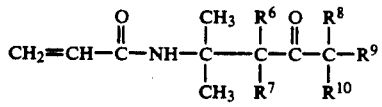

wherein $R^6$, $R^7$, $R^8$, $R^9$ and $R^{10}$ are a hydrogen atom or —$CH_2OH$ group, respectively, and may be the same or different with each other; and from 60 to 99.89 weight % of the component (D) comprising at least one unsaturated monomer selected from the group consisting of unsaturated monomers having the structure of the general formula:

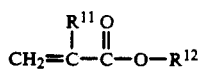

wherein $R^{11}$ is a hydrogen atom or methyl group and $R^{12}$ is an alkyl group of 1 to 14 carbon atoms.

2. A pressure sensitive adhesive composition as claimed in claim 1 wherein the composition comprises from 0.01 to 10 weight parts of a crosslinking agent per 100 weight parts of the acrylic copolymer.

3. A pressure sensitive adhesive composition as claimed in claim 1 wherein the component (A) is one or more kinds of unsaturated monomers selected from the group consisting of N,N-dimethylaminoethylacrylamide, N,N-dimethylaminoethylmethacrylamide, N,N-dimethylaminopropylacrylamide, N,N-dimethylaminopropylmethacrylamide, N,N-diethylaminoethylacrylamide, N,N-diethylaminoethylmethacrylamide, N,N-diethylaminopropylacrylamide and N,N-diethylaminopropylmethacrylamide.

4. A pressure sensitive adhesive composition as claimed in claim 1 wherein the component (B) is one or more kinds of unsaturated monomers selected from the group consisting of 1,1-dimethyl-1-(2-hydroxypropyl)aminemethacrylimide, 1,1-dimethyl-1-(2,3-dihydroxypropyl)aminemethacylimide and 1,1-dimethyl-1-(2-hydroxypropyl)amine 4-isopropenylbenzimide.

5. A pressure sensitive adhesive composition as claimed in claim 1 wherein the component (C) is diacetoneacrylamide and/or hydroxymethyldiacetoneacrylamide.

6. A pressure sensitive adhesive composition as claimed in claim 1 wherein the component (D) is one or more kinds of unsaturated monomers selected from the group consisting of methyl acrylate, ethyl acrylate, butyl acrylate, decyl acrylate, 2-ethylhexyl acrylate, isooctyl acrylate, methyl methacrylate, ethyl methacrylate, butyl methacrylate, decyl methacrylate, 2-ethylhexyl methacrylate and isooctyl methacrylate.

7. A pressure sensitive adhesive composition as claimed in claim 1 wherein the component (D) is the combination of methyl acrylate and 2-ethylhexyl acrylate or the combination of ethyl acrylate and butyl acrylate.

8. A pressure sensitive adhesive composition as claimed in claim 1 wherein the content of the component (A) in the acrylic copolymer is in the range from 0.1 to 15 weight %.

9. A pressure sensitive adhesive composition as claimed in claim 1 wherein the content of the component (A) in the acrylic copolymer is in the range from 0.5 to 10 weight %.

10. A pressure sensitive adhesive composition as claimed in claim 1 wherein the content of the component (B) in the acrylic copolymer is in the range from 0.05 to 8 weight %.

11. A pressure sensitive adhesive composition as claimed in claim 1 wherein the content of the component (B) in the acrylic copolymer is in the range from 0.2 to 5 weight %.

12. A pressure sensitive adhesive composition as claimed in claim 1 wherein the content of the component (C) in the acrylic copolymer is in the range from 0.01 to 10 weight %.

13. A pressure sensitive adhesive composition as claimed in claim 1 wherein the content of the component (D) in the acrylic copolymer is in the range from 67 to 99.84 weight %.

14. A pressure sensitive adhesive composition as claimed in claim 1 wherein 50 weight % or less of the component (D) of the acrylic copolymer is replaced by a copolymerizable unsaturated monomer other than the component (D) which is copolymerizable with the unsaturated monomers of each of the component (A), the component (B), the component (C) and the component (D).

* * * * *

UNITED STATES PATENT AND TRADEMARK OFFICE
CERTIFICATE OF CORRECTION

PATENT NO. : 5,278,271

DATED : January 11, 1994

INVENTOR(S) : MIYAJIMA et al

It is certified that error appears in the above-identified patent and that said Letters Patent is hereby corrected as shown below:

On title page, item [56], right column, line 2, below "Dec. 3, 1990." insert

--Johnson, "Vinyl and Acrylic Adhesives Including Pressure Sensitives", 1971, pages 20 and 21, NOYES DATA CORPORATION--.

Signed and Sealed this

Twentieth Day of December, 1994

Attest:

BRUCE LEHMAN

*Attesting Officer*     *Commissioner of Patents and Trademarks*